United States Patent
Wang

(10) Patent No.: US 12,010,000 B2
(45) Date of Patent: Jun. 11, 2024

(54) MESSAGE SAMPLING METHOD, DECAPSULATION METHOD, NODE, SYSTEM AND STORAGE MEDIUM

(71) Applicant: ZTE CORPORATION, Guangdong (CN)

(72) Inventor: Tongle Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 436 days.

(21) Appl. No.: 17/414,429

(22) PCT Filed: Dec. 17, 2019

(86) PCT No.: PCT/CN2019/126077
§ 371 (c)(1),
(2) Date: Jun. 16, 2021

(87) PCT Pub. No.: WO2020/125650
PCT Pub. Date: Jun. 25, 2020

(65) Prior Publication Data
US 2022/0094613 A1    Mar. 24, 2022

(30) Foreign Application Priority Data

Dec. 17, 2018 (CN) .......................... 201811542968.1

(51) Int. Cl.
*H04L 43/022* (2022.01)
*H04L 43/028* (2022.01)
*H04L 43/10* (2022.01)

(52) U.S. Cl.
CPC .......... *H04L 43/022* (2013.01); *H04L 43/028* (2013.01); *H04L 43/10* (2013.01)

(58) Field of Classification Search
None
See application file for complete search history.

(56) References Cited

U.S. PATENT DOCUMENTS

| | | | |
|---|---|---|---|
| 2011/0222412 | A1 | 9/2011 | Kompella |
| 2015/0146815 | A1 | 5/2015 | Berretta et al. |

(Continued)

FOREIGN PATENT DOCUMENTS

| | | |
|---|---|---|
| CN | 104768176 A | 7/2015 |
| CN | 106506351 A | 3/2017 |
| CN | 108028775 A | 5/2018 |

OTHER PUBLICATIONS

China Patent Office, First Office Action dated Jan. 27, 2022 for application No. CN201811542968.1.

(Continued)

*Primary Examiner* — Minh Trang T Nguyen
(74) *Attorney, Agent, or Firm* — Li & Cai Intellectual Property (USA) Office

(57) ABSTRACT

Disclosed by the embodiments of the present application are a message sampling method in an in-situ operation administration and maintenance (IOAM) mechanism, a data decapsulation method based on the message sampling method in the IOAM mechanism, an encapsulation node, a decapsulation node, a message sampling system and a storage medium. The message sampling method includes: receiving transmission data; and executing, according to a configured sampling mode, an IOAM function on a target message matching the sampling mode in the transmission data.

16 Claims, 9 Drawing Sheets

(56) References Cited

U.S. PATENT DOCUMENTS

2017/0111209 A1   4/2017   Ward et al.
2018/0278548 A1*  9/2018   Pignataro ............... H04L 69/22
2018/0331933 A1   11/2018  Song

OTHER PUBLICATIONS

European Patent Office, The extended European search report dated Aug. 10, 2022 for application No. EP19899770.2.
Brockners F et al:"Data Fields for In-situ OAM", Internet-Draft, Oct. 20, 2018.
Song H et al:"In-situ Flow Information Telemetry Framework", Internet Engineering Task Force, Internet-Draft, Oct. 22, 2018.
Song H et al:"In-situ OAM Data Validation Option", Internet Engineering Task Force, Internet-Draft, Apr. 16, 2018.
Kim Youngho et al:"Selective In-band Network Telemetry for Overhead Reduction", IEEE, 2018 IEEE 7th International Conference on Cloud Networking, Oct. 22, 2018.
WIPO, International Search Report dated Mar. 3, 2020.
Brockners, F. et al. "Data Fields for In-situ OAM," IETF; Oct. 20, 2018.

\* cited by examiner

ND STORAGE MEDIUM

MESSAGE SAMPLING METHOD, DECAPSULATION METHOD, NODE, SYSTEM AND STORAGE MEDIUM

The present application is a National Stage of International Application No. PCT/CN2019/126077, filed Dec. 17, 2019, which claims priority from the Chinese patent application No. 201811542968.1 filed with the China Patent Office on Dec. 17, 2018, both of which are hereby incorporated by reference in their entireties.

TECHNICAL FIELD

The present application relates to network communication technologies, for example, a message sampling method, a data decapsulation method based on the message sampling method, an encapsulation node, a decapsulation node, a message sampling system and a storage medium.

BACKGROUND

On one hand, a data center network has put higher requirements on time delay, packet loss, forwarding paths, reliability and the like. On the other hand, there is an urgent need for a network visualization technology that can continuously acquire operation data of the network to provide decision guidance for network fault removal, network planning, traffic adjustment and the like.

In-situ Operation Administration and Maintenance (In-situ OAM) is a kind of In-situ OAM technology that realizes data center network visualization. With the development of technologies such as large-capacity, high-speed, programmable chips, and P4 (Programming Protocol-Independent Packet Processors), the In-situ OAM technology has also gradually been proposed and applied. The current technical draft is mainly In-site OAM which is also called in-band OAM, of the Internet Engineering Task Force (IETF). The In-site OAM and in-band OAM are collectively called IOAM.

IOAM provides a method for directly adding remote control information to data messages transmitted over a network, but also proposes new requirements on functions and performance of hardware of the forwarding plane. With the development of the programmable chip technology, the IOAM function has already been implemented by programmable chips, and in terms of performance, some chips can support the IOAM function while achieving wire-speed forwarding. In practical applications, however, deployment difficulties may exist due to, for example, insufficient processing capability of the actual network bandwidth and server.

SUMMARY

Embodiments of the present application provide a message sampling method in an IOAM mechanism, a data decapsulation method based on the message sampling method, an encapsulation node, a decapsulation node, a message sampling system and a storage medium.

A first aspect of the embodiments of the present application provides a message sampling method in an IOAM mechanism, including: receiving transmission data; and executing, according to a configured sampling mode, an IOAM function on a target message matching the sampling mode in the transmission data.

A second aspect of the embodiments of the present application provides an encapsulation node, including a first processor, and a first memory storing a computer program executable on the first processor. The first processor is configured to execute the computer program to perform the message sampling method in the IOAM mechanism according to any one of the embodiments of the present application.

A third aspect of the embodiments of the present application provides a data decapsulation method based on the message sampling method in the IOAM mechanism provided in the embodiments of the present application, including acquiring an IOAM header and information of a metadata value of sampling rate in the target message; and encapsulating the IOAM header, the metadata value of sampling rate and an original message corresponding to the target message according to a set protocol, and sending the encapsulated message to a server.

A fourth aspect of the embodiments of the present application provides a decapsulation node, including a second processor, and a second memory storing a computer program executable on the second processor. The second processor is configured to execute the computer program to perform the decapsulation method provided in the embodiments of the present application.

A fifth aspect of the embodiments of the present application provides a message sampling system, including the encapsulation node and the decapsulation node provided in the embodiments of the present application. The encapsulation node encapsulates and sends a target message, and the decapsulation node, after receiving the target message, restores the target message to an original message before the IOAM function is performed, and forwards the original message to a destination node.

The system further includes a server; and the decapsulation node is further configured to: acquire an IOAM header and information of a metadata value of sampling rate in the target message; and encapsulate the IOAM header, the metadata value of sampling rate and the original message corresponding to the target message according to a set protocol, and send the encapsulated message to the server.

The server is configured to: acquire the metadata value of sampling rate from the message, in response to determining that the message is a message carrying IOAM information, the metadata value of sampling rate from the message; and determine an evaluation parameter of a flow according to the acquired metadata value of sampling rate and a number of messages carrying the IOAM information, the evaluation parameter including at least one of a message statistical count and a message rate.

The system further includes a transmission node provided between the encapsulation node and the decapsulation node. The transmission node is configured to forward the message sent from the encapsulation node to the decapsulation node.

A sixth aspect of the embodiments of the present application provides a storage medium storing an executable instruction thereon. The executable instruction, when executed by a processor, causes the message sampling method in the IOAM mechanism according to any embodiment of the present application to be implemented, or the executable instruction, when executed by a processor, causes the decapsulation method according to the embodiments of the present application to be implemented.

DETAILED DESCRIPTION

The applicant has found in the research that the IOAM technology in the related art mainly has the following defects.

1. The IOAM technology in the related art typically enables IOAM monitoring based on the global situation or an interface, or performs IOAM monitoring on multiple flows simultaneously. Since IOAM information is added to all messages, especially in the case of small packets, the transmission of IOAM information during message transmission over a network will occupy so much network bandwidth that the effective bandwidth for network data transmission is reduced, and bandwidth of the existing network may become insufficient after adding the IOAM function.

2. In monitoring of flows, the IOAM information is added to all messages of the Elephant Flow of a single session, which may also occupy more network bandwidth, and reduce the payload utilization rate of the network.

3. When the decapsulation node outputs the IOAM information to the server, the high-rate message output may exceed the processing capability of the server, and other services of the server may be affected during verification.

Figure 1:
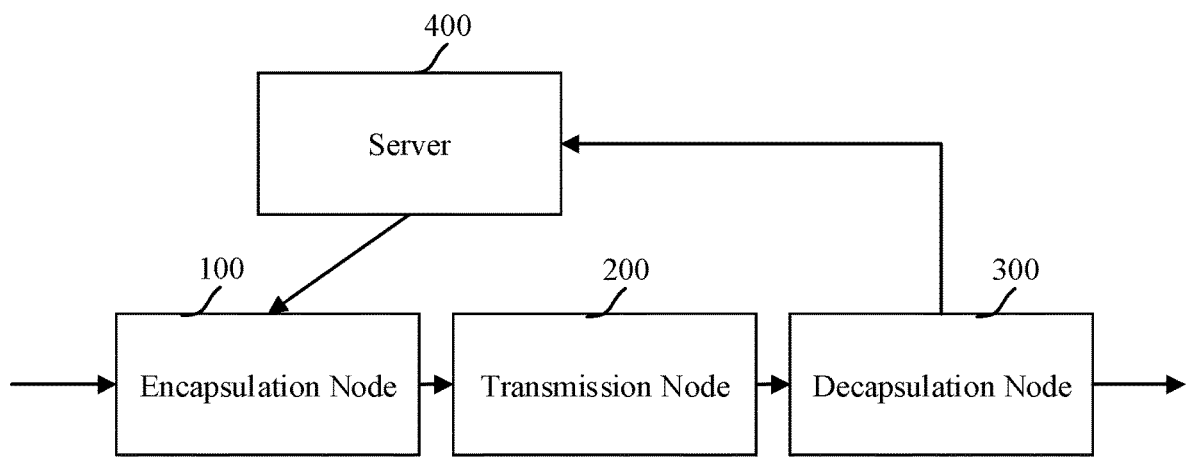
FIG. 1 is an architecture diagram of a message sampling system for a message sampling method in an embodiment of the present application.

In order to avoid the above defects of the IOAM technology in the related art, the embodiments of the present application provide a message sampling method in an IOAM mechanism. Referring to FIG. 1, FIG. 1 is an architecture diagram of a message sampling system for a message sampling method in an IOAM mechanism provided in an embodiment of the present application, where the message sampling system includes an encapsulation node 100, a transmission node 200, a decapsulation node 300, and a server 400.

After message data transmitted over the data center network flows into the encapsulation node 100, the encapsulation node 100 samples the incoming transmission data according to a pre-configured sampling mode, determines a target message matched with the sampling mode on which an IOAM function is to be executed, and encapsulates the target message before sending the encapsulated target message to the transmission node. The encapsulation node 100 will be described in detail in the following embodiments.

The transmission node 200, disposed between the encapsulation node 100 and the decapsulation node 300, is configured to forward the message sent from the encapsulation node 100 to the decapsulation node 300. The transmission node 200 forwarding the received message means performing transmission processing on the received message according to a set rule, such as looking up a label map (LM) table in the message to obtain a label operation type, and performing corresponding forwarding according to the label operation type.

The decapsulation node 300 is configured to parse the received target message carrying IOAM information, extract the IOAM information such as an IOAM header to restore the message to an original message, and then forward the original message to a destination node. On the other hand, the decapsulation node 300 is further configured to re-encapsulate the extracted IOAM information such as the IOAM header and the original message according to a protocol format set with the server, and to send the re-encapsulated message to the server. For example, for a message using sampling rate information in execution of the IOAM function, the decapsulation node 300 acquires an IOAM header and information of a metadata value of sampling rate in the target message by parsing, re-encapsulates the IOAM header, the metadata value of sampling rate and the original message corresponding to the target message according to a set protocol, and sends the encapsulated message to the server 400.

The server 400 is configured to, when the message carries IOAM information, acquire the metadata value of sampling rate from the message; and determine an evaluation parameter of a flow according to the acquired metadata value of sampling rate and the number of messages carrying the IOAM information, the evaluation parameter including at least one of a message statistical count and a message rate.

In the above message sampling system, the encapsulation node executes the IOAM function merely on the matched target message according to the configured sampling mode, which can effectively reduce the network load, and thus avoid the defect of insufficient network bandwidth or network elements for IOAM in practical applications. Accordingly, the decapsulation node only sends the sampled message carrying the IOAM information to the server, which reduces the performance requirement on the processor of the deployed server.

Figure 2:
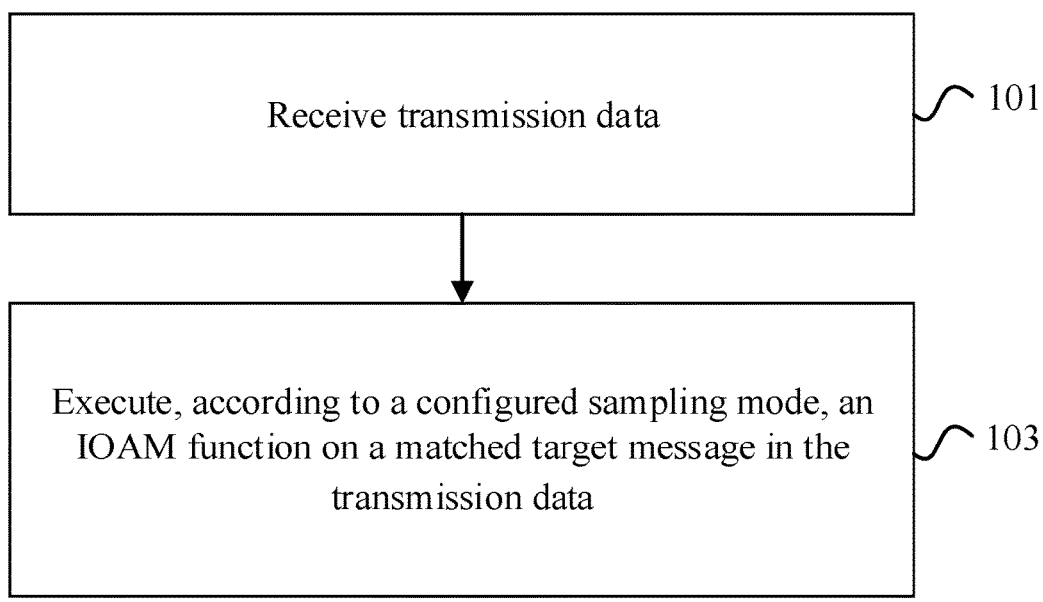
FIG. 2 is a flowchart of a message sampling method in an embodiment of the present application.

Referring to FIG. 2, a flowchart of a message sampling method in an IOAM mechanism provided in an embodiment of the present application is shown, where the message sampling method may be applied to the encapsulation node as shown in FIG. 1, and the message sampling method includes steps 101 and 103.

In step 101, receiving transmission data.

In step 103, executing, according to a configured sampling mode, an IOAM function on a target message matching the sampling mode in the transmission data.

Here, the encapsulation node may be a data communication device such as a physical server, a virtual machine, a switch or a router. The encapsulation node receiving the transmission data means that the encapsulation node receives a data message flowing into the encapsulation node during the transmission process of the data center network. The configured sampling mode refers to a configured sampling manner, in which a data message of the transmission data is identified to determine the matched target message as the sampling object, and the sampling object is processed according to the configured sampling manner. It should be noted that there may be various sampling modes, and different sampling modes correspond to different sampling objects and/or different sampling manners, respectively.

The above embodiments provide a message sampling method in an IOAM mechanism, a data decapsulation method based on the message sampling method in the IOAM mechanism, an encapsulation node, a decapsulation node, a message sampling system and a storage medium. The message sampling method includes: receiving transmission data; and executing, according to a configured sampling mode, an IOAM function on a target message matching the sampling mode in the transmission data. In this manner, the encapsulation node executes the IOAM function on the matched target message in the transmission data by the configured sampling mode so that in the IOAM mechanism, the IOAM function is executed merely on the matched target message among data messages transmitted over the data center network according to the pre-configured sampling mode, which can effectively reduce the network load, and thus avoid the defects of insufficient network bandwidth, or insufficient processing capability of the server or the network element, in practical applications when the IOAM technology in the related art is adopted.

In some embodiments, before the step 103 of executing, according to the configured sampling mode, the IOAM function on the target message matching the sampling mode in the transmission data, the method includes: acquiring a configuration parameter, and determining the corresponding sampling mode according to the configuration parameter. The configuration parameter includes a sampling object.

Here, the encapsulation node acquiring the configuration parameter may include: the encapsulation node receiving a configuration parameter input through a command line; or, the encapsulation node receiving a configuration parameter input by a network administrator by initiating a configuration request; or, the encapsulation node receiving a configuration parameter input by configuring through a controller. The sampling object refers to an individual selected as a target object. In the embodiments, the sampling object may be configured based on at least one of: a physical port, a Virtual Local Area Network (VLAN) interface, a VLAN sub-interface, and a flow. Taking the sampling object configured based on a flow as an example, the sampling may be performed by matching a flow feature, such as by matching the quintuple. Here, the quintuple refers to a source Internet Protocol (IP) address, a source port, a destination IP address, a destination port and a transport layer protocol.

In the above embodiments of the present application, the configuration parameter includes a sampling object, and determining the corresponding sampling mode according to the configuration parameter may refer to: configuring different sampling modes for different sampling objects, respectively; or configuring the same sampling mode for all the configured sampling objects.

In some embodiments, the configuration parameter further includes a sampling manner corresponding to the sampling object, at least one sampling object is present, and determining the corresponding sampling mode according to the configuration parameter includes: determining a sampling mode corresponding to each sampling object according to the configuration parameter.

Here, the configuration parameter further including a sampling manner corresponding to the sampling object means that a corresponding sampling manner is configured for each sampling object. Different sampling manners means that during configuration of the IOAM function, it is determined whether to configure a sampling function at the same time, and whether to configure an adding sampling rate function simultaneously. Accordingly, configuring the sampling manner corresponding to each sampling object may include: not configuring a sampling function during configuration of the IOAM function for a designated sampling object, simultaneously configuring a sampling function but not configuring an adding sampling rate function during configuration of the IOAM function for a designated sampling object, simultaneously configuring a sampling function and an adding sampling rate function during configuration of the IOAM function for a designated sampling object, or other sampling manners. The encapsulation node stores the configuration parameter and determines the sampling mode corresponding to each sampling object according to the configuration parameter, thereby flexibly supporting the IOAM function on the target message in the corresponding sampling mode in different practical applications.

In the above embodiments of the present application, determining the sampling mode corresponding to each sampling object may include: adopting, under the condition that the sampling manner is configuring the IOAM function but not configuring the sampling function, a first sampling mode in which the IOAM function is executed on all messages; adopting, under the condition that the sampling manner is configuring the IOAM function and the sampling function but not configuring the adding sampling rate function, a second sampling mode in which the IOAM function is executed on the sampled message without adding the sampling rate information; and adopting, under the condition that the sampling manner is configuring the IOAM function and the sampling function, as well as the adding sampling rate function, a third sampling mode in which the IOAM function is executed on the sampled message while adding the sampling rate information. Different sampling modes about whether to add sampling rate information may be configured for different sampling objects, respectively; or the same sampling mode about whether to add sampling rate information may be uniformly configured for all the configured sampling objects.

In some embodiments, the sampling mode may include at least one of: a first sampling mode of executing the IOAM function on each message, a second sampling mode of executing the IOAM function on a message of a designated sampling object without adding sampling rate information, and a third sampling mode of executing the IOAM function on a message of a designated sampling object and adding sampling rate information. The sampling modes will be described one by one below.

The first sampling mode of executing the IOAM function on each message means not configuring a sampling function during configuration of the IOAM function for a designated sampling object. In the first sampling mode, the sampling rate may include all or may be not limited, and the encapsulation node does not sample the messages when implementing the IOAM function. The IOAM function, adding of an IOAM header, and adding of related metadata information processing are executed on each target message in the flow to be executed the IOAM function.

The second sampling mode of executing the IOAM function on a message of a designated sampling object without adding sampling rate information means simultaneously configuring a sampling function but not configuring an adding sampling rate function during configuration of the IOAM function for a designated sampling object. In the second sampling mode, the encapsulation node, when implementing the IOAM function, adds a sampling flag to the target message according to a configured sampling rate, adding an IOAM header to the target message with the sampling flag without setting a sampling rate flag bit or adding a metadata value of sampling rate.

The third sampling mode of executing the IOAM function on a message of a designated sampling object and adding sampling rate information means simultaneously configuring a sampling function and configuring an adding sampling rate function during configuration of the IOAM function for a designated sampling object. In the third sampling mode, the encapsulation node, when implementing the IOAM function, adds a sampling flag to the target message according to the configured sampling rate, adding an IOAM header to the target message with the sampling flag while setting a sampling rate flag bit and adding a metadata value of sampling rate in the set field.

In the third sampling mode, depending on different manners used for setting the sampling rate flag bit and adding the metadata value of sampling rate, the method can be classified into an IOAM type method and an IOAM flag method. The third sampling mode of executing the IOAM function on the message of the designated sampling object and adding the sampling rate information includes at least one of: executing the IOAM function on the message of the designated sampling object and adding sampling rate information by an IOAM type method; and executing the IOAM function on the message of the designated sampling object and adding sampling rate information by an IOAM flag method.

Here, the IOAM type method in the third sampling mode means configuring the IOAM function for the designated sampling object while simultaneously configuring the sampling function and adding the sampling rate function by an IOAM type method. In the third sampling mode, the IOAM type method is used when the sampling rate function is added. The encapsulation node, when implementing the IOAM function, adds a sampling flag to the sampled message according to the configured sampling rate, and adds an IOAM header to the message with the sampling flag while setting a sampling rate flag bit in the IOAM type field and adding a metadata value of sampling rate. The IOAM flag method in the third sampling mode means executing the IOAM function on the message of a designated sampling object and adding sampling rate information by an IOAM flag method. The IOAM flag method differs from the IOAM type method in that the encapsulation node, when implementing the IOAM function, adds a sampling flag to the sampled message according to the configured sampling rate, and adds an IOAM header to the message with the sampling flag while setting a sampling rate flag bit in the IOAM flag field and adding a metadata value of sampling rate.

In the above embodiments of the present application, any one of the sampling modes may be started on an independent encapsulation node, or more than one sampling mode may be started on an encapsulation node in a hybrid manner.

In some embodiments, the step 103 of executing, according to the configured sampling mode, the IOAM function on the target message matching the sampling mode in the transmission data includes: adding a flag to the target message and adding an IOAM header to the flagged target message, when the transmission data is determined to be a matched target message according to the configured sampling mode.

In the embodiments of the present application, sampling the target message does not means copying a message, but adding a sampling flag to a matched message. The flag may be carried by a message or by context of a message. After the data flow enters the encapsulation node, the encapsulation node samples the matched target message according to a pre-configured sampling mode, and adds an IOAM header to the target message with the sampling flag. The data type encapsulation format of the IOAM header mainly includes three types: IOAM-Trace-Type, IOAM-POT-Type and IOAM-E2E-Type. By sampling and marking the matched target message, it is convenient to complete the identification of the target message and perform the IOAM function on the corresponding target message.

In some embodiments, the step 103 of executing, according to the configured sampling mode, the IOAM function on the matched target message in the transmission data includes: adding an IOAM header and a metadata value of sampling rate to each message, under the condition that the configured sampling mode is determined to be the first sampling mode.

Here, the encapsulation node may determine the current corresponding sampling mode according to the configuration parameter. When it is determined that the sampling mode is the first sampling mode, the encapsulation node does not sample the messages when implementing the IOAM function, and adds an IOAM header and related metadata information processing to each message in the flow implementing the IOAM function. The first sampling mode may be adapted to settings of some sampling objects, so as to flexibly support the IOAM function on the target message of different sampling objects in the corresponding sampling mode in different practical applications.

The step of executing, according to the configured sampling mode, the IOAM function on the matched target message in the transmission data includes: adding a flag to the sampled target message according to the configured sampling rate, and adding an IOAM header to the flagged target message without setting a sampling flag bit or adding a metadata value of sampling rate, under the condition that the configured sampling mode is determined to be the second sampling mode.

Here, the encapsulation node may determine the current corresponding sampling mode according to the configuration parameter. When it is determined that the sampling mode is the second sampling mode, the encapsulation node, when implementing the IOAM function, adds a sampling flag to the sampled message according to the configured sampling rate, and adds an IOAM header to the message with the sampling flag without setting the sampling flag bit in IOAM-Trace-Type or adding the metadata information of the sampling rate to a node data list. The second sampling mode may be adapted to settings of some sampling objects, so as to flexibly support the IOAM function on the target message of different sampling objects in the corresponding sampling mode in different practical applications.

The step of executing, according to the configured sampling mode, the IOAM function on the matched target message in the transmission data includes: adding a flag to the sampled target message according to the configured sampling rate, and adding an IOAM header to the flagged target message while setting a sampling rate flag bit and adding a metadata value of sampling rate, under the condition that the configured sampling mode is determined to the third sampling mode.

Here, the encapsulation node may determine the current corresponding sampling mode according to the configuration parameter. When it is determined that the sampling mode is the third sampling mode, the encapsulation node, when implementing the IOAM function, adds a sampling flag to the sampled message according to the configured sampling rate, and adds an IOAM header to the message with the sampling flag. The third sampling mode may be adapted to settings of the sampling object to be subjected to evaluation parameter analysis based on sampling information, so as to flexibly support the IOAM function on the target message of different sampling objects in the corresponding sampling mode in different practical applications.

In some embodiments, adding the IOAM header to the flagged target message while setting the sampling rate flag bit and adding the metadata value of sampling rate includes: adding an IOAM header to the flagged target message, and setting the sampling rate flag bit in a reserved or extended data bit set in a type field of the IOAM header; and adding the metadata value of sampling rate to a node data list, under the condition that the sampling rate flag bit is a set value; and not adding the metadata value of sampling rate, under the condition that the sampling rate flag bit is not a set value.

Here, for the sampling mode of executing the IOAM function and adding the sampling rate information, when adding an IOAM header to the flagged target message, the IOAM type method or the IOAM flag method may be selected for adding the sampling rate information depending on different data type encapsulation formats of the IOAM header. As described in the foregoing third sampling mode, when adding the IOAM header, the encapsulation node adds the sampling rate information using the IOAM type method, which includes: setting, when adding the IOAM header to the target message, a sampling rate flag bit in a reserved or extended data bit set in a type field of the IOAM header; adding, under the condition that the sampling rate flag bit is a set value, the metadata value of sampling rate to a node data list; and not adding the metadata value of sampling rate under the condition that the sampling rate flag bit is not a set value.

Figure 3:
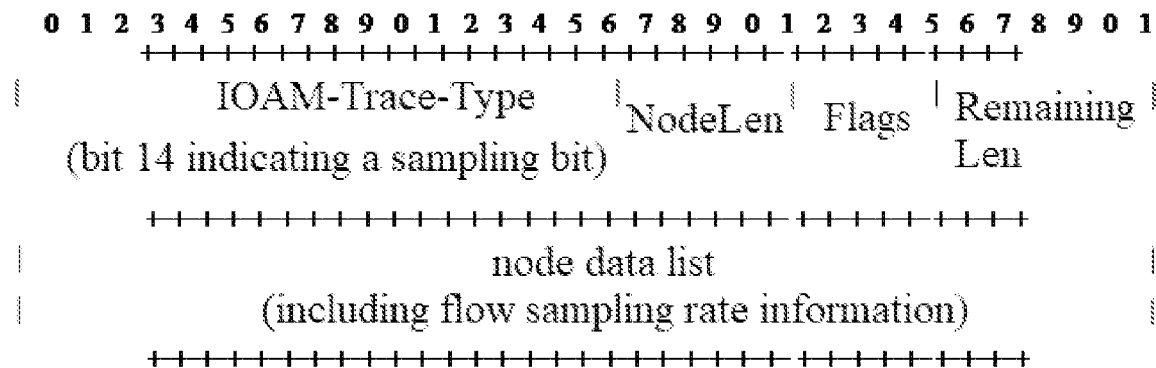
FIG. 3 is a schematic diagram showing a header format and a data field format for sampling an IOAM header of an IOAM-Trace-Type according to an IOAM type method in an embodiment of the present application.
Figure 4:
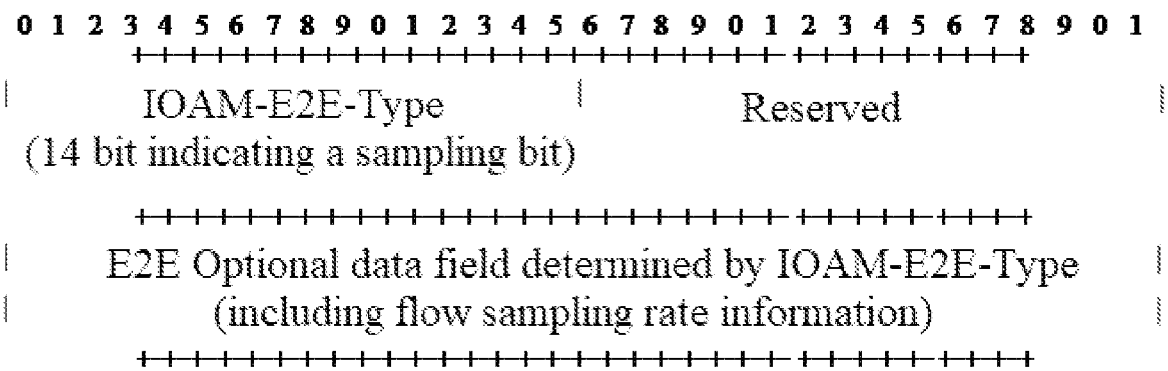
FIG. 4 is a schematic diagram showing a header format and a data field format for sampling an IOAM header of an IOAM-E2E-Type according to an IOAM type method in an embodiment of the present application.

Referring to FIG. 3, FIG. 3 shows a header format and a data field format for sampling an IOAM header of IOAM-Trace-Type by the IOAM type method; and referring to FIG. 4, FIG. 4 shows a header format and a data field format for sampling an IOAM header of IOAM-E2E-Type by the IOAM type method. Taking an IOAM header of IOAM-Trace-Type as an example, when adding an IOAM header to the matched target message, the encapsulation node may select one bit (e.g., bit 14) from the existing reserved bits of an IOAM-Trace-Type field in the IOAM header as a sampling rate flag bit for indicating that a metadata value of a flow sampling rate exists in the node data list added by the encapsulation node. It should be noted that, in a scenario where the IOAM-Trace-Type field in the IOAM header is extendable, an extended bit may be defined as a sampling rate flag bit. It should be noted that the foregoing is described by taking an IOAM header of IOAM-Trace-Type as an example, and the corresponding description is also applicable to an IOAM header of IOAM-E2E-Type, which is not repeated herein.

In the embodiments of the present application, by setting a sampling rate flag bit in a reserved data bit or an extended data bit set in a type field of the IOAM header, the encapsulation node may select whether to add the metadata value of sampling rate to the node data list according to the setting of the sampling rate flag bit in the type field. If the sampling rate flag bit is set, the metadata value of sampling rate is added to the node data list, and if the sampling rate flag bit is not set, it is not necessary to add the metadata value of sampling rate to the node data list.

In some embodiments, adding the IOAM header to the flagged target message while setting the sampling rate flag bit and adding the metadata value of sampling rate includes: adding the IOAM header to the flagged target message, and setting the sampling rate flag bit in a reserved data bit set in a flag field of the IOAM header; and adding the metadata value of sampling rate into the flag field of the IOAM header, under the condition that the sampling rate flag bit is a set value; and not adding the metadata value of sampling rate under the condition that the sampling rate flag bit is not a set value.

Here, for the sampling mode of executing the IOAM function and adding the sampling rate information, when adding an IOAM header to the flagged target message, the encapsulation node may select the IOAM type method or the IOAM flag method for adding the sampling rate information depending on different data type encapsulation formats of the IOAM header. As described in the foregoing fourth sampling mode, when adding the IOAM header, the encapsulation node adds the sampling rate information using the IOAM flag method, which includes: setting, when adding the IOAM header to the flagged target message, a sampling rate flag bit in a reserved data bit set in a flag field of the IOAM header; adding, under the condition that the sampling rate flag bit is a set value, the metadata value of sampling rate into the flag field of the IOAM header; and not adding the metadata value of sampling rate under the condition that the sampling rate flag bit is not a set value.

Figure 5:
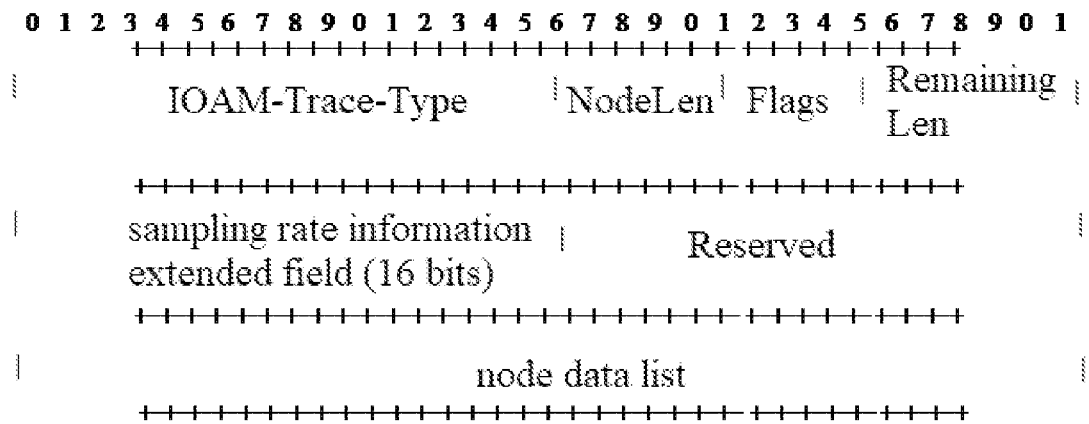
FIG. 5 is a schematic diagram showing a header format and a data field format for sampling an IOAM header of an IOAM-Trace-Type according to an IOAM flag method in an embodiment of the present application.
Figure 6:
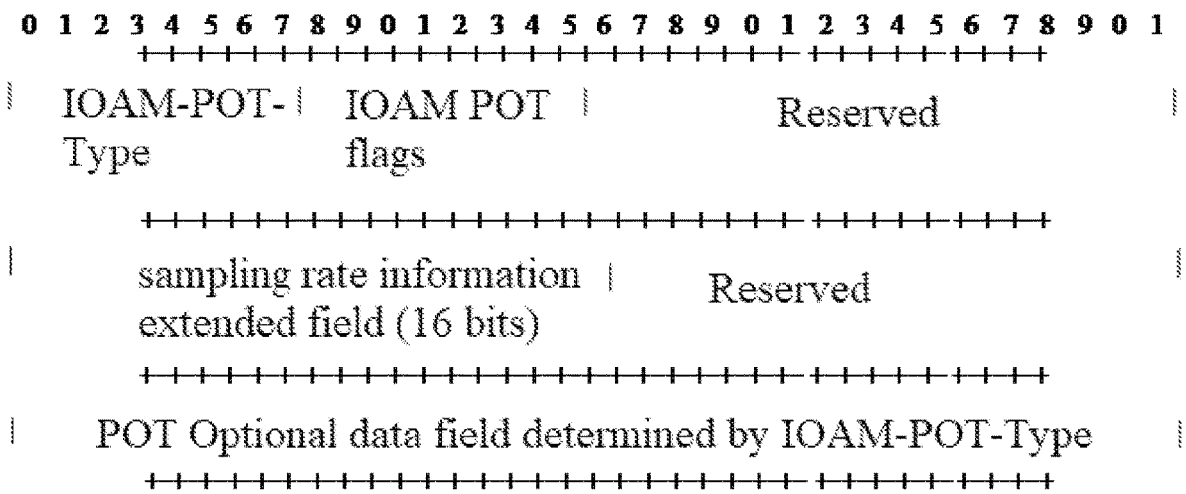
FIG. 6 is a schematic diagram showing a header format and a data field format for sampling an IOAM header of an IOAM-POT-Type according to an IOAM flag method in an embodiment of the present application.
Figure 7:
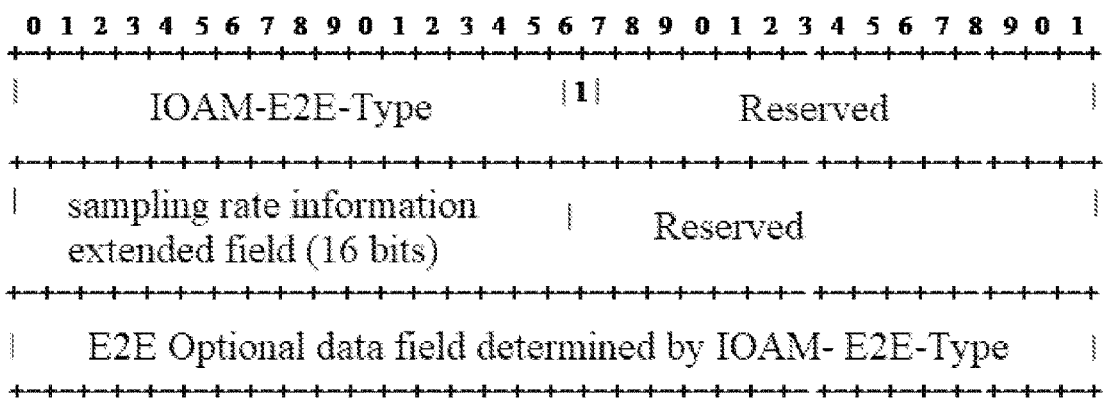
FIG. 7 is a schematic diagram showing a header format and a data field format for sampling an IOAM header of an IOAM-E2E-Type according to an IOAM flag method in an embodiment of the present application.

Referring to FIG. 5, FIG. 5 shows a header format and a data field format for sampling an IOAM header of IOAM-Trace-Type by the IOAM flag method; referring to FIG. 6, FIG. 6 shows a header format and a data field format for sampling an IOAM header of IOAM-POT-Type by the IOAM flag method; and referring to FIG. 7, FIG. 7 shows a header format and a data field format for sampling an IOAM header of IOAM-E2E-Type by the IOAM flag method.

When adding an IOAM header to the matched target message, the encapsulation node may select one bit from the existing reserved bits of a flag field in the IOAM header as a sampling rate flag bit. For example, in the IOAM header of IOAM-Trace-Type shown in FIG. 5, bit 2 of Reserved in the flag field is used as a sampling rate flag bit, and the field of the metadata value of sampling rate is extended in the IOAM header to occupy 16 bits. As another example, in the IOAM header of IOAM-POT-Type shown in FIG. 6, bit 2 of Reserved in the flag field is used as a sampling rate flag bit, and the field of the metadata value of sampling rate is extended in the IOAM header to occupy 16 bits, or the metadata value of sampling rate is added by the existing Reserved field. As still another example, in the IOAM header of IOAM-E2E-Type shown in FIG. 7, the highest bit of Reserved in the flag field of the IOAM header is taken as a sampling flag bit, and the field of the metadata value of sampling rate is extended in the IOAM header to occupy 16 bits.

In the embodiments of the present application, by setting a sampling rate flag bit in a reserved data bit set in a flag field of the IOAM header, and extending the field in the IOAM header or using the existing reserved field to save the metadata value of sampling rate, the encapsulation node may select whether to fill the metadata value of sampling rate in the sampling rate field according to the setting of the sampling rate flag bit in the flag field. If the sampling rate flag bit is set, the metadata value of sampling rate is filled in the sampling rate field, and if the sampling rate flag bit is not set, it is not necessary to fill the metadata value of sampling rate in the sampling rate field.

Figure 8:
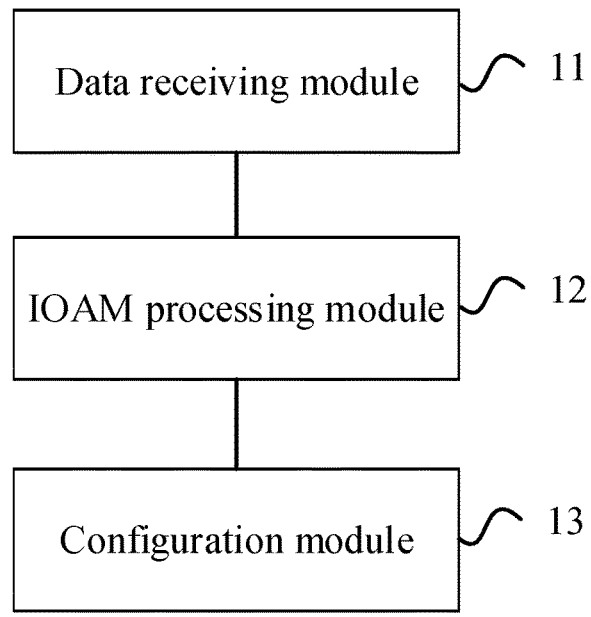
FIG. 8 is a schematic structural diagram of a message sampling apparatus in an embodiment of the present application.

The embodiments of the present application further provide a message sampling apparatus in an IOAM mechanism. Referring to FIG. 8, the message sampling apparatus includes a data receiving module 11 configured to receive transmission data; and an IOAM processing module 12 configured to execute, according to a configured sampling mode, an IOAM function on a matched target message in the transmission data.

In some embodiments, the message sampling apparatus further includes a mode configuration module 13 configured to acquire a configuration parameter, and determine the corresponding sampling mode according to the configuration parameter. The configuration parameter includes a sampling object.

In some embodiments, the configuration parameter further includes a sampling manner corresponding to the sampling object, and the configuration module is configured to determine a sampling mode corresponding to each sampling object according to the configuration parameter.

In some embodiments, the sampling object includes at least one of: a physical port, a VLAN interface, a VLAN sub-interface, or a flow.

In some embodiments, the sampling mode includes at least one of: a first sampling mode of executing the IOAM function on each message, a second sampling mode of executing the IOAM function on a message of a designated sampling object without adding sampling rate information, or a third sampling mode of executing the IOAM function on a message of a designated sampling object and adding sampling rate information.

In some embodiments, the third sampling mode of executing the IOAM function on the message of the designated sampling object and adding the sampling rate information includes at least one of: executing the IOAM function on the message of the designated sampling object and adding sampling rate information by an IOAM type method; and executing the IOAM function on the message of the designated sampling object and adding sampling rate information by an IOAM flag method.

In some embodiments, the IOAM processing module 12 is configured to add a flag to the target message and add an IOAM header to the flagged target message, when the transmission data is determined to be a matched target message according to the configured sampling mode.

In some embodiments, the IOAM processing module 12 is configured to add an IOAM header and a metadata value of sampling rate to each message, under the condition that the configured sampling mode is determined to be the first sampling mode.

In some embodiments, the IOAM processing module 12 is configured to add a flag to the sampled target message according to the configured sampling rate and add an IOAM header to the flagged target message without setting a sampling flag bit or adding a metadata value of sampling rate, under the condition that the configured sampling mode is determined to be the second sampling mode.

In some embodiments, the IOAM processing module 12 is configured to add a flag to the sampled target message according to the configured sampling rate and add an IOAM header to the flagged target message while setting a sampling rate flag bit and adding a metadata value of sampling rate, under the condition that the configured sampling mode is determined to be the third sampling mode.

In some embodiments, the IOAM processing module 12 adding the IOAM header to the flagged target message while setting the sampling rate flag bit and adding the metadata value of sampling rate includes: adding the IOAM header to the flagged target message, and setting the sampling rate flag bit in a reserved or extended data bit set in a type field of the IOAM header; adding the metadata value of sampling rate to a node data list under the condition that the sampling rate flag bit is a set value; and not adding the metadata value of sampling rate under the condition that the sampling rate flag bit is not a set value.

In some embodiments, the IOAM processing module 12 adding the IOAM header to the flagged target message while setting the sampling rate flag bit and adding the metadata value of sampling rate includes: adding the IOAM header to the flagged target message, and setting the sampling rate flag bit in a reserved data bit set in a flag field of the IOAM header; adding the metadata value of sampling rate into the flag field of the IOAM header under the condition that the sampling rate flag bit is a set value; and not adding the metadata value of sampling rate under the condition that the sampling rate flag bit is not a set value.

When the IOAM function is executed after the message is sampled, the message sampling apparatus provided in the foregoing embodiments is merely illustrated by dividing the program modules in an exemplary manner. In practical applications, the above steps may be allocated to and completed by different program modules as needed, that is, the internal structure of the apparatus may be divided into different program modules to complete all or part of the above-described processing. In addition, the message sampling apparatus provided in the foregoing embodiments and the message sampling method applied to the encapsulation node belong to the same concept, and specific implementation processes thereof are described in detail in the method embodiments and thus are not repeated here.

Figure 9:
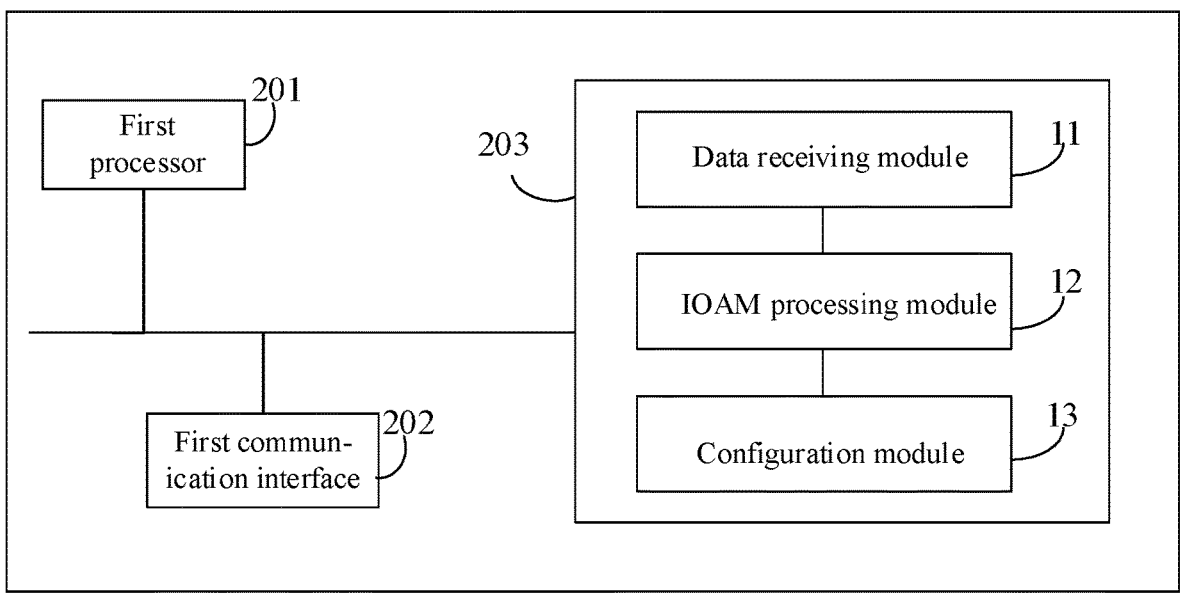
FIG. 9 is a schematic structural diagram of an encapsulation node according to an embodiment of the present application.

The embodiments of the present application further provide an encapsulation node. Referring to FIG. 9, the encapsulation node includes a first processor 201, and a first memory 203 storing a computer program executable on the first processor 201. The first processor 201 is configured to execute the computer program to perform the message sampling method applied to an encapsulation node provided in any embodiment of the present application. Here, the first processor 201 and the first memory 203 do not refer to a corresponding number of one, but may be at least one. The encapsulation node may further include a first communication interface 202 connected to the first processor 201 via a bus.

In the embodiments, the encapsulation node may be a data communication device such as a physical server, a virtual machine, a switch or a router. The encapsulation node includes the first memory 203 and the first processor 201 as described above. In the executable instructions stored on the first memory 203, the program modules corresponding to the computer program of the message sampling method include: a data receiving module 11, an IOAM processing module 12 and a configuration module 13.

Figure 10:
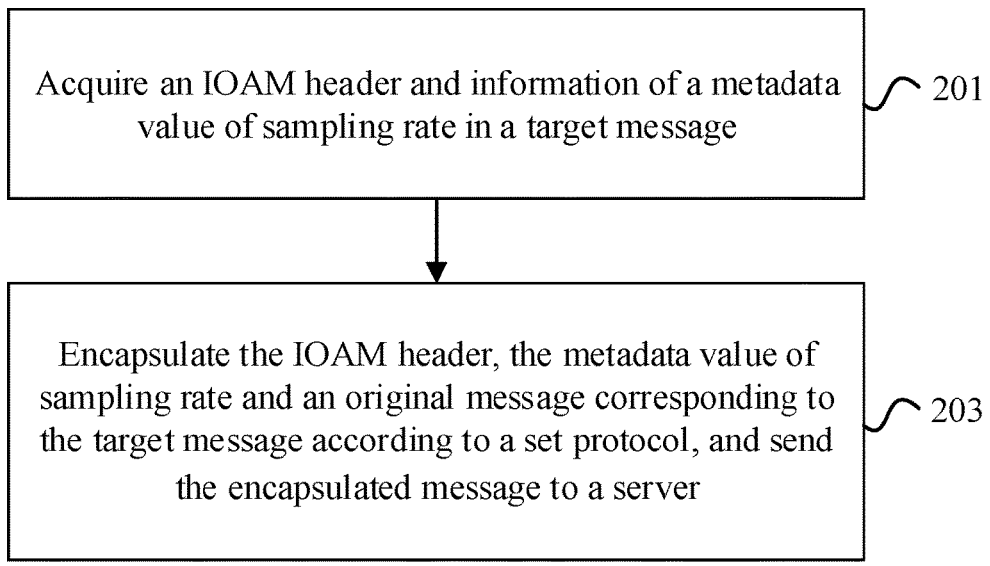
FIG. 10 is a schematic flowchart of a data decapsulation method based on the message sampling method in the IOAM mechanism in an embodiment of the present application.

Referring to FIG. 10, the embodiments of the present application further provide a data decapsulation method based on the message sampling method in an IOAM mechanism as described above. The data decapsulation method is applied to a decapsulation node and includes steps 201 and 203.

In step 201, acquiring an IOAM header and information of a metadata value of sampling rate in the target message.

In step 203, encapsulating the IOAM header, the metadata value of sampling rate and an original message corresponding to the target message according to a set protocol, and sending the encapsulated message to a server.

Here, for the message sampling method in the IOAM mechanism provided in the embodiments of the present application, the encapsulation node samples the incoming transmission data according to a pre-configured sampling mode, determines the matched target message on which the IOAM function is to be executed, and then sends the same to the decapsulation node. The decapsulation node performs decapsulation operation on the sent data, and by parsing the received target message carrying IOAM information, re-encapsulates the extracted IOAM information such as the IOAM header and the original message according to a protocol format set with the server, and sends the re-encapsulated message to the server so that the server determines an evaluation parameter of a flow according to the acquired metadata value of sampling rate and the number of messages carrying the IOAM information. For example, for a message using sampling rate information in execution of the IOAM function, the decapsulation node acquires an IOAM header and information of a metadata value of sampling rate in the target message by parsing, re-encapsulates the IOAM header, the metadata value of sampling rate and the original message corresponding to the target message according to a set protocol, and sends the encapsulated message to a server.

The decapsulation method further includes: parsing the received target message carrying IOAM information, extracting the IOAM information such as an IOAM header therefrom to restore the message to an original message, and then forwarding the original message to a destination node.

Figure 11:
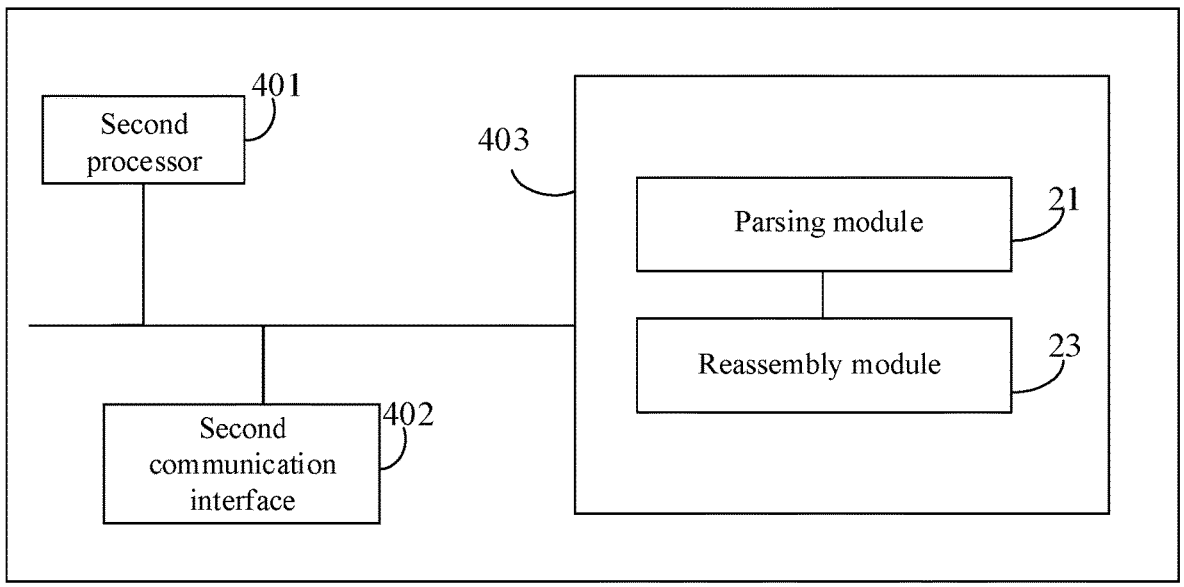
FIG. 11 is a schematic structural diagram of a decapsulation node in an embodiment of the present application.

The embodiments of the present application further provide a decapsulation node. Referring to FIG. 11, the decapsulation node includes a second processor 401, and a second memory 403 storing a computer program executable on the second processor 401. The second processor 401 is configured to execute the computer program to perform steps of the data decapsulation method for the message sampling method in the IOAM mechanism provided in any embodiment of the present application. Here, the second processor 401 and the second memory 403 do not refer to a corresponding number of one, but may be at least one. The decapsulation node may further include a second communication interface 402 connected to the second processor 401 via a bus.

In the executable instructions stored on the second memory 403 included in the decapsulation node, the program modules corresponding to the computer program of the decapsulation method may include a parsing module 21 and a reassembly module 23. The parsing module 21 is configured to acquire an IOAM header and information of a metadata value of sampling rate in the target message. The reassembly module 23 is configured to encapsulate the IOAM header, the metadata value of sampling rate and the original message corresponding to the target message according to a set protocol, and send the encapsulated message to a server.

The message sampling method in the IOAM mechanism provided in the embodiments of the present application is mainly explained above from the perspective of the encapsulation node sampling the data message according to the configured sampling mode. In order to facilitate understanding of the implementation principle of the message sampling method in the IOAM mechanism provided in the embodiments of the present application, the message sampling method applied to the message sampling system including the above encapsulation node is described below from the perspective of the message sampling system, and the message sampling method is described from the perspective of the respective flows implemented by the encapsulation node, the transmission node, the decapsulation node, and the server.

Figure 12:
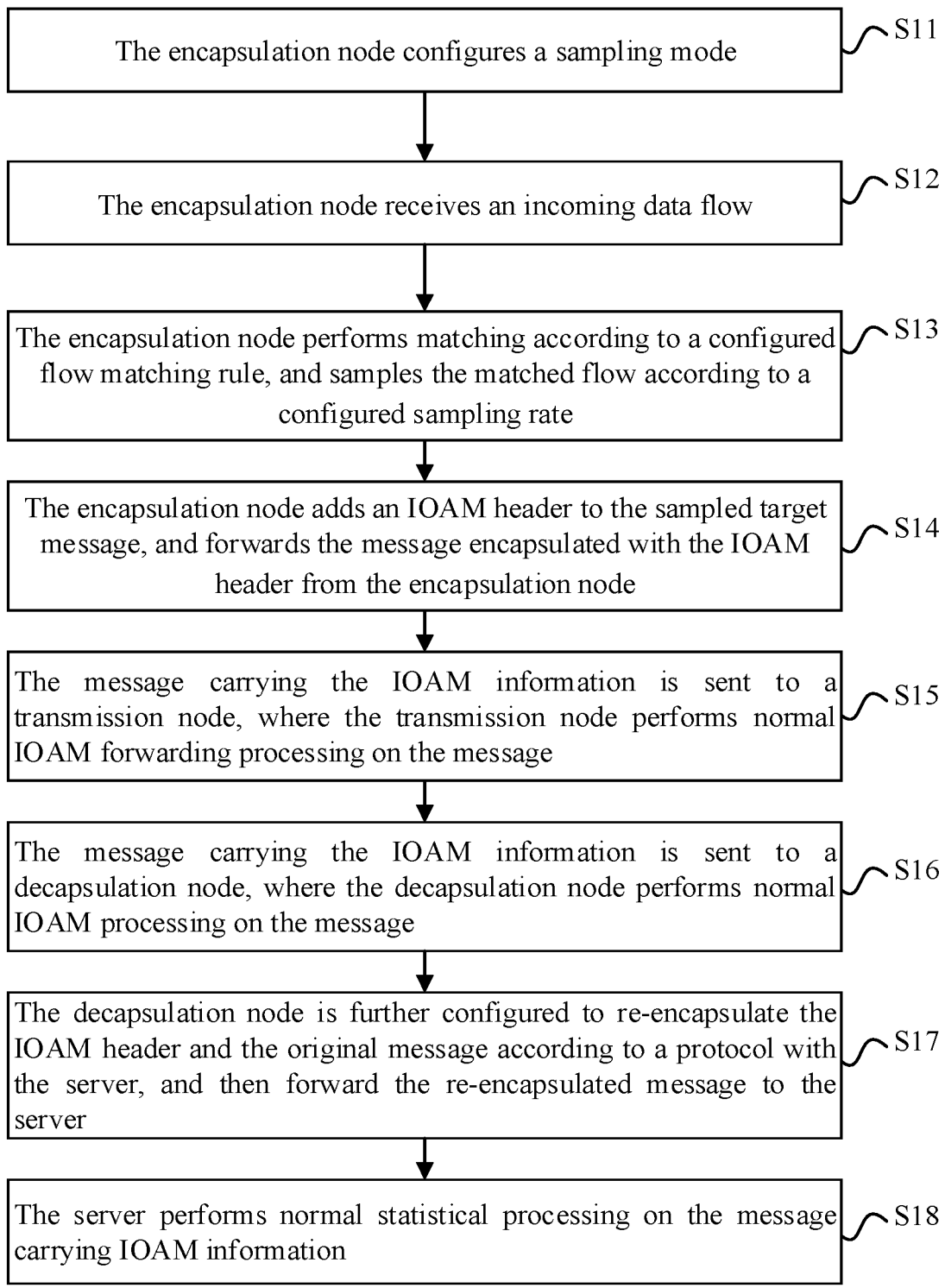
FIG. 12 is a schematic flowchart of a message sampling method applied to a message sampling system in an embodiment of the present application.

Referring to FIG. 12, taking the sampling mode of only sampling without adding the sampling rate information as an example, the message sampling method applied to the message sampling system includes steps 11 to 18.

In step S11, the encapsulation node configures a sampling mode. The related configuration of the sampling object and the IOAM function to the encapsulation node may be performed by a command line, a network administrator, or a controller, such as a sampling mode based on flow sampling. The configuration parameter includes a flow matching field (e.g., quintuple), and the sampling mode is a second sampling mode of executing the IOAM function on a message of a designated sampling object without adding sampling rate information.

In step S12, the encapsulation node receives an incoming data flow.

In step S13, the encapsulation node performs matching according to a configured flow matching rule, and samples the matched flow according to a configured sampling rate.

In step S14, the encapsulation node adds an IOAM header to the sampled target message, and forwards the message encapsulated with the IOAM header from the encapsulation node.

In step S15, the message carrying the IOAM information is sent to a transmission node, where the transmission node performs normal IOAM forwarding processing on the message.

In step S16, the message carrying the IOAM information is sent to a decapsulation node, and the decapsulation node performs normal IOAM processing on the message. The decapsulation node may strip the IOAM header from the message according to a method specified in the IOAM draft, and forward the original message restored to a normal service message to a destination node. The original message with the IOAM information stripped is forwarded to a destination.

In step S17, the decapsulation node is further configured to re-encapsulate the IOAM header and the original message according to a protocol with the server, and then forward the re-encapsulated message to the server. The server may be a collector or a controller.

In step S18, the server performs normal statistical processing on the message carrying IOAM information.

Figure 13:
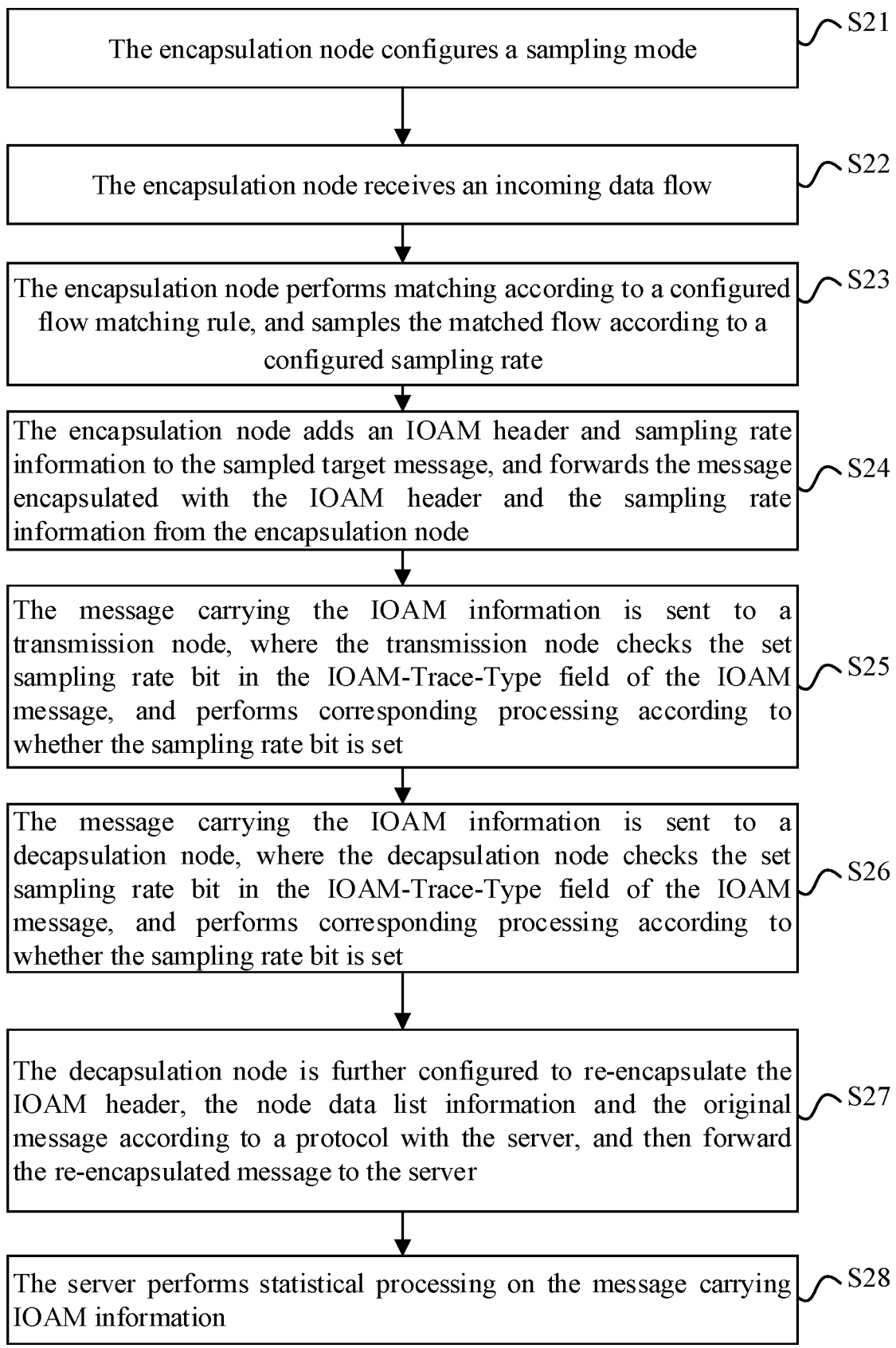
FIG. 13 is a schematic flowchart of a message sampling method applied to a message sampling system in another embodiment of the present application.

Referring to FIG. 13, taking the sampling mode of only sampling without adding the sampling rate information as an example, the sampling rate information is added by the IOAM type method, and the message sampling method includes steps 21 to 28.

In step S21, the encapsulation node configures a sampling mode. The related configuration of the sampling object and the IOAM function to the encapsulation node may be performed by a command line, a network administrator, or a controller, such as a sampling mode based on flow sampling. The configuration parameter includes a flow matching field (e.g., quintuple), and the sampling mode is a third sampling mode of executing the IOAM function on a message of a designated sampling object and adding sampling rate information.

In step S22, the encapsulation node receives an incoming data flow.

In step S23, the encapsulation node performs matching according to a configured flow matching rule, and samples the matched flow according to a configured sampling rate.

In step S24, the encapsulation node adds an IOAM header and sampling rate information to the sampled target message, and forwards the message encapsulated with the IOAM header and the sampling rate information from the encapsulation node. It should be noted that the encapsulation node adds an IOAM header to only the sampled message, and one bit (for example, bit 14, bits 0 to 13 have definite definitions in the draft) is selected from the existing reserved bits of the IOAM-Trace-Type (also applicable to IOAM-E2E-Type) field in the IOAM header to indicate that a flow sampling rate field exists in the node data list added by the encapsulation node. The current reserved bit of the IOAM-Trace-Type field is bit 14, but if the IOAM-Trace-Type field is extended in a later updated version of the IOAM draft, an extended bit may be defined as a sampling rate bit. Accordingly, the encapsulation node adds the metadata value of sampling rate to the node data list based on the setting of the sampling rate bit in IOAM-Trace-Type. The message encapsulated with the IOAM header and the metadata information is forwarded from the encapsulation node.

In step S25, the message carrying the IOAM information is sent to a transmission node, and the transmission node checks the set sampling rate bit in the IOAM-Trace-Type field of the IOAM message and performs corresponding processing according to whether the sampling rate bit is set. If it is found that the sampling rate bit is not set, it is not necessary to add a value of sampling rate to the node data list. If it is found that the sampling rate bit is set, since the transmission node is not an encapsulation node, an invalid value 0 is filled in the metadata value of sampling rate, and normal IOAM forwarding processing is performed on the message.

In step S26, the message carrying the IOAM information is sent to a decapsulation node, and the decapsulation node checks the set sampling rate bit in the IOAM-Trace-Type field of the IOAM message and performs corresponding processing according to whether the sampling rate bit is set. If it is found that the sampling rate bit is not set, it is not necessary to add the value of sampling rate to the node data list. If it is found that the sampling rate bit is set, since the decapsulation node is not an encapsulation node, an invalid value 0 is filled in the metadata value of sampling rate, and normal IOAM processing is performed on the message.

The decapsulation node may strip the IOAM header and the node data list information from the message according to a method specified in the IOAM draft, and forward the original message restored to a normal service message to a destination node. The original message with the IOAM information stripped is forwarded to a destination.

In step S27, the decapsulation node is further configured to re-encapsulate the IOAM header, the node data list information and the original message according to a protocol with the server, and then forward the re-encapsulated message to the server. The server may be a collector or a controller.

In step S28, the server performs statistical processing on the message carrying IOAM information, determines whether the metadata of the node data list information carries the sampling rate information based on whether the sampling rate bit of the IOAM-Trace-Type field is set, obtains the flow sampling rate from the metadata information of a head node recorded in the node data list, and evaluates a message statistical count, a message rate, and the like of the flow according to the obtained flow sampling rate and the sampled message count.

Figure 14:
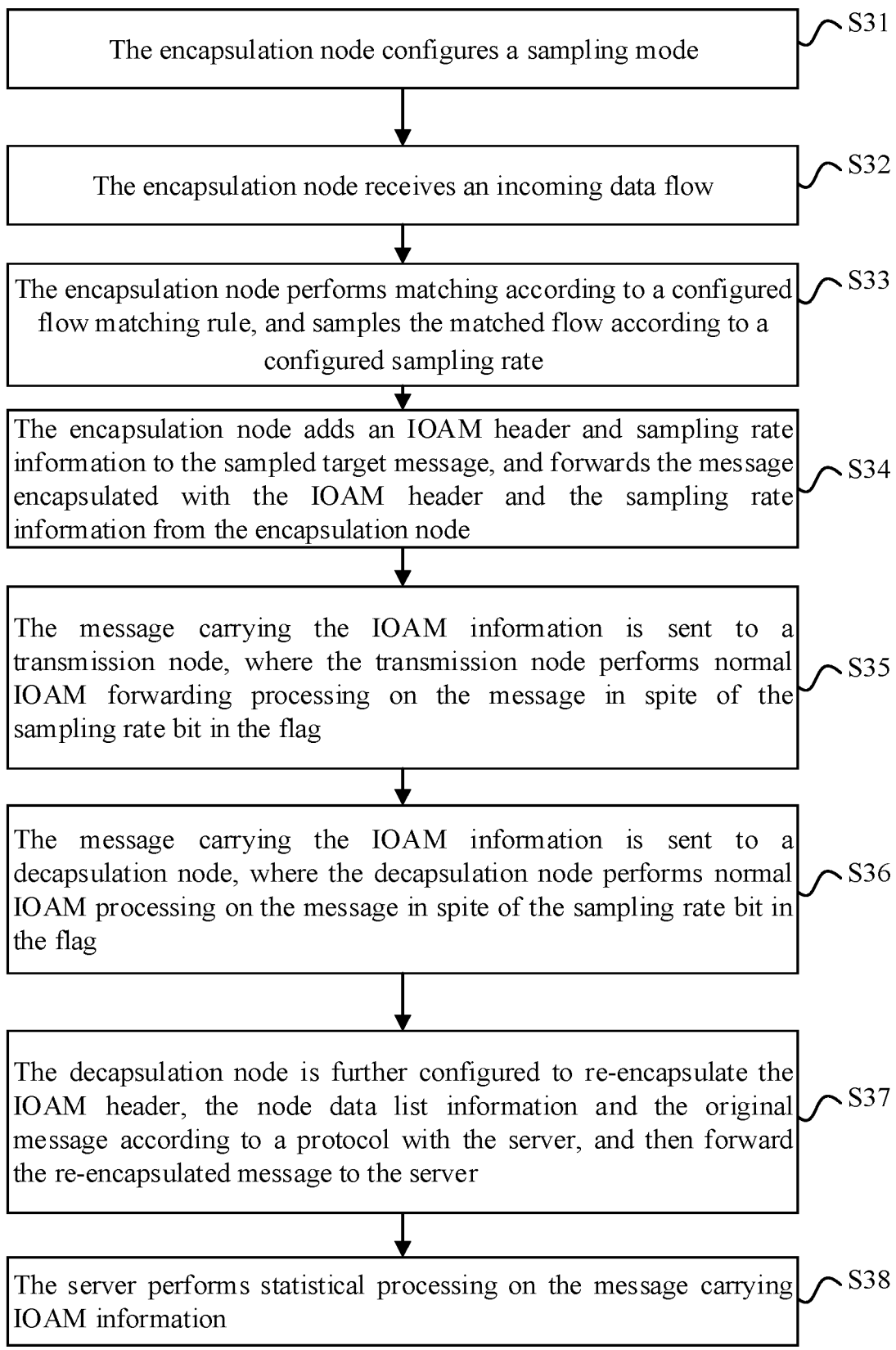
FIG. 14 is a schematic flowchart of a message sampling method applied to a message sampling system in yet another embodiment of the present application.

Referring to FIG. 14, taking the sampling mode of only sampling without adding the sampling rate information as an example, the sampling rate information is added by the IOAM flag method, and the message sampling method includes steps 31 to 38.

In step S31, the encapsulation node configures a sampling mode. The related configuration of the sampling object and the IOAM function to the encapsulation node may be performed by a command line, a network administrator, or a controller, such as a sampling mode based on flow sampling. The configuration parameter includes a flow matching field (e.g., quintuple), and the sampling mode is a fourth sampling mode of executing the IOAM function on a message of a designated sampling object and adding sampling rate information.

In step S32, the encapsulation node receives an incoming data flow.

In step S33, the encapsulation node performs matching according to a configured flow matching rule, and samples the matched flow according to a configured sampling rate.

In step S34, the encapsulation node adds an IOAM header and sampling rate information to the sampled target message, and forwards the message encapsulated with the IOAM header and the sampling rate information from the encapsulation node. It should be noted that the encapsulation node adds an IOAM header to only the sampled message, optionally sets a sampling rate bit in the existing reserved bit of a flag field in the IOAM header, and fills the metadata value of sampling rate in the sampling rate field. The message encapsulated with the IOAM header and the metadata information is forwarded from the encapsulation node.

In step S35, the message carrying the IOAM information is sent to a transmission node, and the transmission node performs normal IOAM forwarding processing on the message in spite of the sampling rate bit in the flag.

In step S36, the message carrying the IOAM information is sent to a decapsulation node, and the decapsulation node performs normal IOAM processing on the message in spite of the sampling rate bit in the flag.

The decapsulation node may strip the IOAM header and the node data list information from the message according to a method specified in the IOAM draft, and forward the original message restored to a normal service message to the destination node. The original message with the IOAM information stripped is forwarded to a destination.

In step S37, the decapsulation node is further configured to re-encapsulate the IOAM header, the node data list information and the original message according to a protocol with the server, and then forward the re-encapsulated message to the server. The server may be a collector or a controller.

In step S38, the server performs statistical processing on the message carrying IOAM information, determines whether the message is an IOAM sampling message according to whether the sampling rate bit in the IOAM flag field is set, obtains a sampling rate information value from the sampling rate information field, and evaluates a message statistical count, a message rate, and the like of the flow according to the obtained flow sampling rate and the sampled message count.

Figure 15:
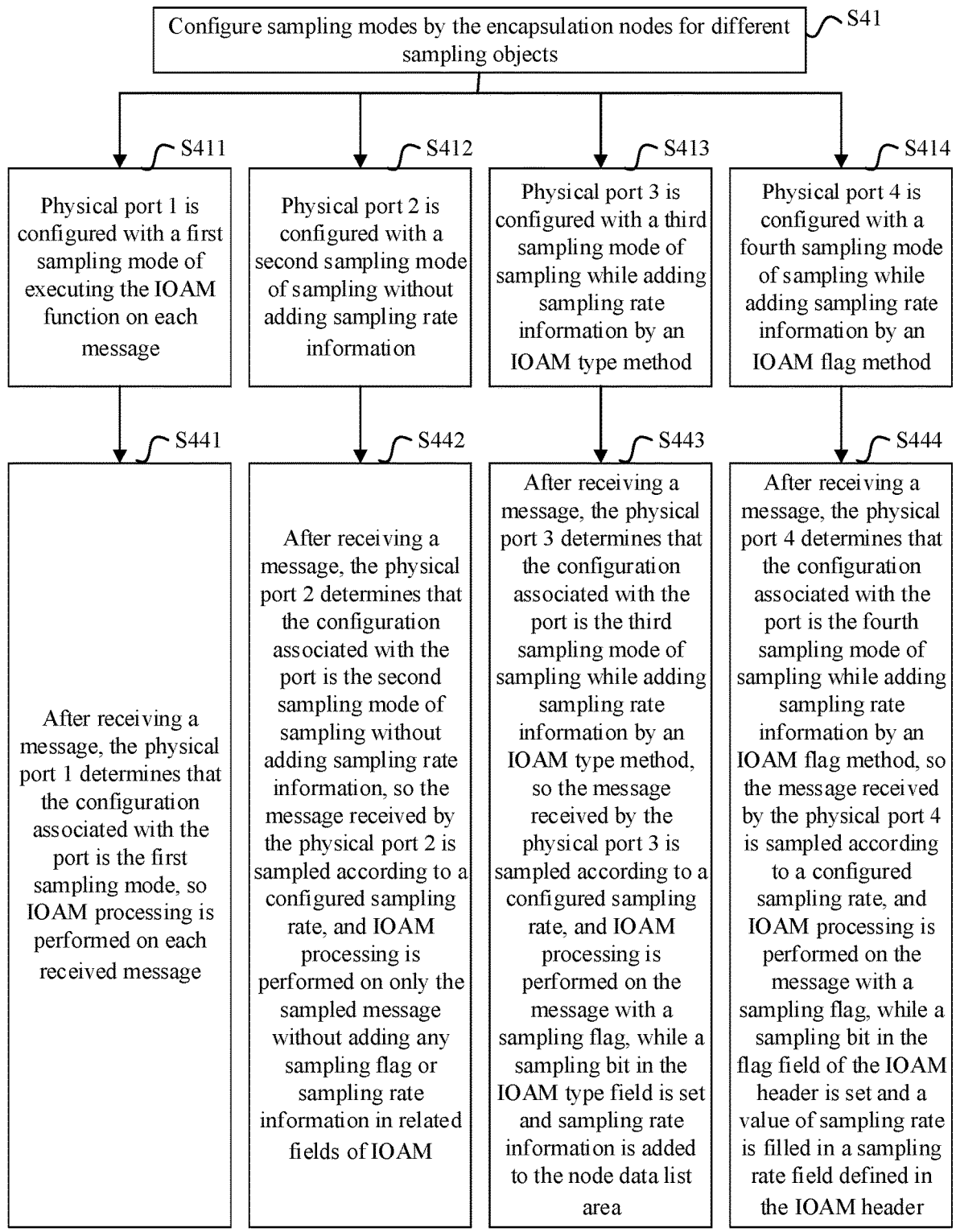
FIG. 15 is a schematic flowchart of a message sampling method applied to a message sampling system in still another embodiment of the present application.

Referring to FIG. 15, taking the mode of adopting different sampling modes for different sampling objects as an example, the message sampling method includes the following step.

In step S41, the encapsulation node configures a sampling mode and performs sampling, including: configuring sampling modes by the encapsulation nodes for different sampling objects, respectively. The related configuration of the sampling object and the IOAM function to the encapsulation node may be performed by a command line, a network administrator, or a controller. For example:

In step 411, a physical port 1 is configured with a first sampling mode of executing the IOAM function on each message.

In step S412, a physical port 2 is configured with a second sampling mode of sampling without adding sampling rate information.

In step S413, a physical port 3 is configured with a third sampling mode of sampling while adding sampling rate information by an IOAM type method.

In step S414, a physical port 4 is configured with a fourth sampling mode of sampling while adding sampling rate information by an IOAM flag method.

It should be noted that adopting different sampling modes for different sampling objects supports the associated configuration of sampling modes based on various sampling objects such as the global situation, physical ports, VLAN interfaces, various VLAN sub-interfaces, flow key fields, and the like, instead of being limited to physical ports.

The encapsulation node receives an incoming data flow.

The encapsulation node performs matching according to a configured sampling mode, and samples the matched flow according to the corresponding configured sampling mode, respectively.

For the sampled target message, the encapsulation node executes the IOAM function according to the corresponding sampling mode and then forwards the sampled target message from the encapsulation node, which includes the following steps.

In step S441, after receiving a message, the physical port 1 determines that the configuration associated with the port is the first sampling mode, so IOAM processing is performed on each received message.

In step S442, after receiving a message, the physical port 2 determines that the configuration associated with the port is the second sampling mode of sampling without adding sampling rate information, so the message received by the physical port 2 is sampled according to a configured sampling rate, and IOAM processing is performed on only the sampled message without adding any sampling flag or sampling rate information in related fields of IOAM.

In step S443, after receiving a message, the physical port 3 determines that the configuration associated with the port is the third sampling mode of sampling while adding sampling rate information by an IOAM type method, so the message received by the physical port 3 is sampled according to a configured sampling rate, and IOAM processing is performed on the message with a sampling flag, while a sampling bit in the IOAM type field is set and sampling rate information is added to the node data list area.

In step S444, after receiving a message, the physical port 4 determines that the configuration associated with the port is the fourth sampling mode of sampling while adding sampling rate information by an IOAM flag method, so the message received by the physical port 4 is sampled according to a configured sampling rate, and IOAM processing is performed on the message with a sampling flag, while a sampling bit is set in the flag field of the IOAM header and a value of sampling rate is filled in a sampling rate field defined in the IOAM header.

The transmission node analyzes the received message carrying the IOAM information, and performs normal metadata addition and message forwarding on the IOAM message, which includes: performing normal IOAM forwarding processing on the message without sampling rate information; or parsing an IOAM type field in an IOAM header, and filling a value 0 in a sampling rate information field of the data list if it is found that the sampling bit is set, and parsing an IOAM flag field in an IOAM header and performing normal IOAM processing if it is found that the sampling bit is set and the transmission node is not concerned.

The decapsulation node parses the received message, and performs the following processing if the message carries the IOAM information: parsing an IOAM type field in an IOAM header, and filling a value 0 in a sampling rate information field of the data list if it is found that the sampling bit is set; and parsing an IOAM flag field in an IOAM header, and performing normal IOAM processing, if it is found that the sampling bit is set and the decapsulation node is not concerned.

The decapsulation node processes the IOAM message by stripping the IOAM header and the node data list information from the message according to a method specified in the IOAM draft, and forwarding the message restored to a normal service message to a destination node.

The decapsulation node is further configured to re-encapsulate the IOAM header, the node data list information and the original message according to a protocol with the server, and then forward the re-encapsulated message to the server. The server may be a collector or a controller.

The server receives the message carrying IOAM information from the decapsulation node and performs the following processing: acquiring, when the server learns from the set sampling rate bit of IOAM-Trace-Type that the metadata information of the node data list includes sampling rate information, a sampling rate of the flow from the metadata information of a head node (i.e., the encapsulation node) recorded in the node data list; acquiring, when the server learns from set sampling rate bit in the flag field of the IOAM header that the message is an IOAM sampling message, sampling rate information of the flow from the sampling rate information field; and performing, when the first sampling mode or the second sampling mode is correspondingly adopted at the encapsulation node, normal acquisition and processing of IOAM information.

The embodiments of the present application further provide a storage medium, such as a memory storing executable instruction thereon. The executable instruction may be executed by a processor to cause the message sampling method applied to an encapsulation node provided in any embodiment of the present application to be implemented, or to cause the decapsulation method provided in any embodiment of the present application to be implemented. The computer storage medium may be a ferroelectric random-access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disc, or a compact disc read-only memory (CD-ROM), or other memories; or may be various devices including any one or combination of the above memories.

The invention claimed is:

1. A message sampling method in an In-situ Operation Administration and Maintenance (IOAM) mechanism, comprising:
receiving transmission data; and
executing, according to a configured sampling mode, an IOAM function on a target message matching the sampling mode in the transmission data,
wherein the sampling mode indicates executing the IOAM function on a message of a designated sampling object and adding sampling rate information, and executing, according to the configured sampling mode, the IOAM function on the target message matching the sampling mode in the transmission data comprises: marking the sampled target message according to a configured sampling rate, and adding an IOAM header to the marked target message while setting a sampling rate flag bit and adding a metadata value of sampling rate.

2. The method according to claim 1, wherein before executing, according to the configured sampling mode, the IOAM function on the target message matching the sampling mode in the transmission data, the method further comprises:
acquiring a configuration parameter, and determining the corresponding sampling mode according to the configuration parameter; wherein the configuration parameter comprises a sampling object.

3. The method according to claim 2, wherein the configuration parameter further comprises a sampling manner corresponding to the sampling object, the sampling object comprises at least one sampling object, and determining the corresponding sampling mode according to the configuration parameter comprises:
determining a sampling mode corresponding to each sampling object according to the configuration parameter.

4. The method according to claim 2, wherein the sampling object comprises at least one of: a physical port, a Virtual Local Area Network (VLAN) interface, a VLAN sub-interface, or a flow.

5. The method according to claim 1, wherein executing the IOAM function on the message of the designated sampling object and adding the sampling rate information comprises at least one of:
executing the IOAM function on the message of the designated sampling object and adding the sampling rate information by an IOAM type method; and
executing the IOAM function on the message of the designated sampling object and adding the sampling rate information by an IOAM flag method.

6. The method according to claim 1, wherein adding the IOAM header to the marked target message while setting the sampling rate flag bit and adding the metadata value of sampling rate comprises:
adding the IOAM header to the marked target message, and setting the sampling rate flag bit in a reserved or extended data bit set in a type field of the IOAM header; and
adding the metadata value of sampling rate to a node data list, in response to the sampling rate flag bit being a set value; and not adding the metadata value of sampling rate, in response to the sampling rate flag bit being not a set value.

7. The method according to claim 1, wherein adding the IOAM header to the marked target message while setting the sampling rate flag bit and adding the metadata value of sampling rate comprises:
adding the IOAM header to the marked target message, and setting the sampling rate flag bit in a reserved data bit set in a flag field of the IOAM header; and
adding the metadata value of sampling rate into the flag field of the IOAM header, in response to the sampling rate flag bit being a set value; and not adding the metadata value of sampling rate, in response to the sampling rate flag bit being not a set value.

8. A data decapsulation method based on the message sampling method in an In-situ Operation Administration and Maintenance (IOAM) mechanism according to claim 1, comprising:
acquiring an IOAM header and information of a metadata value of sampling rate in a target message; and
encapsulating the IOAM header, the metadata value of sampling rate and an original message corresponding to the target message according to a set protocol, and sending the encapsulated message to a server.

9. A decapsulation node, comprising a second processor, and a second memory storing a computer program executable on the second processor; wherein
the second processor is configured to execute the computer program to perform the decapsulation method according to claim 8.

10. A non-transitory computer-readable storage medium storing an executable instruction thereon, wherein the executable instruction, when executed by a processor, causes the data decapsulation method according to claim 8 to be implemented.

11. A non-transitory computer-readable storage medium storing an executable instruction thereon, wherein the executable instruction, when executed by a processor, causes the message sampling method according to claim 1 to be implemented.

12. An encapsulation node, comprising a first processor, and a first memory storing a computer program executable on the first processor; wherein
the first processor is configured to execute the computer program to perform the message sampling method according to claim 1.

13. A message sampling system, comprising an encapsulation node of claim 12 and a decapsulation node, wherein:
the encapsulation node is configured to encapsulate and send a target message; and
the decapsulation node is configured to, after receiving the target message, restore the target message to an original message before an In-situ Operation Administration and Maintenance (IOAM) function is performed, and forward the original message to a destination node.

14. The system according to claim 13, further comprising a server; wherein
the decapsulation node is further configured to: acquire an IOAM header and information of a metadata value of sampling rate in the target message; and encapsulate the IOAM header, the metadata value of sampling rate and the original message corresponding to the target message according to a set protocol, and send the encapsulated message to the server.

15. The system according to claim 13, further comprising a transmission node provided between the encapsulation node and the decapsulation node, wherein the transmission node is configured to forward the message sent from the encapsulation node to the decapsulation node.

16. The system according to claim 14, wherein
the server is configured to: acquire the metadata value of sampling rate from the message, in response to determining that the message is a message carrying IOAM information; and determine an evaluation parameter of a flow according to the acquired metadata value of sampling rate and a number of messages carrying the IOAM information, the evaluation parameter comprising at least one of a message statistical count and a message rate.

* * * * *